(12) United States Patent
Nagao et al.

(10) Patent No.: US 8,429,997 B2
(45) Date of Patent: Apr. 30, 2013

(54) FEEDER FOR MACHINE TOOL

(75) Inventors: Akihiko Nagao, Yamanashi (JP);
Akihiko Fujimoto, Yamanashi (JP);
Naoki Sato, Yamanashi (JP); Akira Funakoshi, Yamanashi (JP)

(73) Assignee: Fanuc Corporation (JP)

( * ) Notice: Subject to any disclaimer, the term of this patent is extended or adjusted under 35 U.S.C. 154(b) by 139 days.

(21) Appl. No.: 13/034,734

(22) Filed: Feb. 25, 2011

(65) Prior Publication Data
US 2011/0286811 A1 Nov. 24, 2011

(30) Foreign Application Priority Data
May 19, 2010 (JP) .................................. 2010-115647

(51) Int. Cl.
*G05G 11/00* (2006.01)
(52) U.S. Cl.
USPC ....................................................... 74/490.09
(58) Field of Classification Search ............... 74/490.08, 74/490.09
See application file for complete search history.

(56) References Cited

U.S. PATENT DOCUMENTS

| | | | |
|---|---|---|---|
| 4,911,589 A | 3/1990 | Winkler et al. | |
| 5,724,893 A * | 3/1998 | Lee et al. | 108/20 |
| 6,327,929 B1 * | 12/2001 | Yanagisawa | 74/490.09 |
| 6,486,429 B1 | 11/2002 | Wehrli et al. | |
| 7,481,126 B2 * | 1/2009 | Las Navas Garcia | 74/89.23 |

FOREIGN PATENT DOCUMENTS

| | | |
|---|---|---|
| DE | 901485 B | 1/1954 |
| DE | 3731005 A1 | 3/1989 |
| DE | 19932645 C1 | 2/2001 |
| DE | 202007013009 U1 | 3/2009 |
| JP | 3256910 A | 11/1991 |
| JP | 4275852 A | 10/1992 |
| JP | 4283041 A | 10/1992 |
| JP | 2001300832 | 10/2001 |

OTHER PUBLICATIONS

DE Examination Report dated Dec. 1, 2011.
JPO Office Action for JP-2010-115647, mailed May 5, 2011.

* cited by examiner

*Primary Examiner* — Justin Krause
(74) *Attorney, Agent, or Firm* — Lowe Hauptman Ham & Berner, LLP

(57) ABSTRACT

A feeder for a machine tool adapted to move a table relative to a saddle by rotation of a motor includes a ball thread nut fixed to the saddle and a ball thread shaft that engages with the ball thread nut in a rotatable manner but is immovable in an axial direction of the ball thread shaft relative to the table. The motor is fixed to the table and the ball thread shaft is coupled to the motor. A sum of a movable distance of the table relative to the saddle and a length of the saddle in the axial direction is shorter than a length of the table in the axial direction. The feeder further includes rails fixed to the table on its surface where the motor is fixed and bearings that are fixed to the saddle and bear the rails.

2 Claims, 4 Drawing Sheets

FEEDER FOR MACHINE TOOL

RELATED APPLICATIONS

The present application is based on, and claims priority from, Japanese Application Number 2010-115647, filed May 19, 2010, the disclosure of which is hereby incorporated by reference herein in its entirety.

BACKGROUND OF THE INVENTION

1. Field of the Invention

The present invention relates to a structure of a feeder for a machine tool that is adapted to move a table relative to a saddle by means of a motor.

2. Description of the Related Art

A technology for a feeder having a structure in which a ball thread moves together with a table is disclosed, for example, in Japanese Patent Application Laid-Open No. 2001-300832. In a machine tool with such a feeder, a cover generally called a telescopic cover that expands and contracts during axial movement is used since a drive part needs to be protected against chips and cutting fluid and for the purpose of suppressing the size of the machine tool. A mechanism for expanding and contracting the telescopic cover may be a mechanism provided with stoppers at both ends of a movable area to suppress expansion and/or contraction, a mechanism that uses a pantograph for follow-up movement.

FIGS. 5 and 6 are views for explaining a structure of a feeder adapted to move a table relative to a saddle in a machine tool including the saddle and the table that moves relative to the saddle.

A ball thread nut 3b that engages with a ball thread shaft 2b is fixed on a lower surface (a surface facing a saddle 7b) of a table 6b. On the other hand, the ball thread shaft 2b is attached on an upper surface (a surface facing the table 6b) of the saddle 7b in a manner such that the thread shaft 2b engages with the nut 3b, is rotatable but is not movable in an axial direction of the thread shaft 2b relative to the saddle 7b. One end of the ball thread shaft 2b is coupled to a motor 1b fixed to the saddle 7b.

Further, rails 4b along a linear axis are fixed on both the left and right portions of the upper surface of the saddle 7b, and bearings 5b along the linear axis that bear the rails 4b are fixed on both the left and right portions of the lower surface of the table.

In FIG. 6, a ball thread shaft 10b for moving the saddle 7b in a direction perpendicular to the axial direction of the thread shaft 2b relative to a machine base 14a (FIG. 5) engages with a ball thread nut 11b fixed to the saddle 7b and has one end coupled to a motor 9b.

With the above-described structure, a motor drive part including the motor 1b and the ball thread shaft 2b moves together with the saddle 7b relative to the table 6b. Accordingly, it is necessary to attach to the table 6b a telescopic cover 8b, which expands and contracts with the movement of the motor drive part (the motor 1b and the ball thread shaft 2b) relative to the table 6b so as to always protect the motor drive part.

A common disadvantage of mechanisms for expanding and contracting a telescopic cover is that such a mechanism may be easily damaged and thus requires periodic maintenance since it needs to follow a rapid movement in an axial direction and reduce the impact thereof.

In addition, if a feeder for a machine tool having a first axis and a second axis as control axes, for example, is structured to move a saddle relative to a machine base in a first direction and to move a table relative to the saddle in a second direction perpendicular to the first direction, the first axis needs to be driven together with the structure of the second axis. Thus, the mass of a movable part on the first axis and that on the second axis typically differ widely from each other. Accordingly, due to the difference between the mass of the movable part on the first axis and that on the second axis, complex control for synchronizing the two axes is required and it is difficult to improve the precision of machining of a workpiece by the machine tool.

SUMMARY OF THE INVENTION

In view of the above-described disadvantages of the related art, an object of the present invention is to provide a feeder for a machine tool having a protective structure that can suppress the size of the machine tool and that is inexpensive and reliable by fixing position of a table relative to a motor drive part (a ball thread shaft and a motor for driving the table coupled to the thread shaft) even when the table moves relative to a saddle.

Another object of the present invention is to provide a structure of a machine tool that can be controlled synchronizing a first axis and a second axis that are control axes at high precision.

A first aspect of a feeder for a machine tool according to the present invention is a feeder for a machine tool adapted to move a table relative to a saddle in one axial direction by rotation of a motor, including: a ball thread nut fixed to the saddle; and a ball thread shaft that engages with the ball thread nut in a manner such that it is rotatable but immovable in an axial direction relative to the table. The motor is fixed to the table and the ball thread shaft is coupled to the motor, and a length obtained by adding a relative movement distance of the saddle relative to the table to a size of the saddle in a direction of movement relative to the table is shorter than a size of the table in a direction of movement relative to the saddle.

A second aspect of a feeder for a machine tool according to the present invention is a feeder for a machine tool adapted to move a saddle relative to a machine base in a first axial direction by means of a first motor and to move a table relative to the saddle in a second direction perpendicular to the first direction by means of a second motor, including: a first ball thread nut fixed to the saddle; a first ball thread shaft that engages with the first ball thread nut in a manner such that it is rotatable but immovable in an axial direction relative to the machine base; a second ball thread nut fixed to the saddle; and a second ball thread shaft that engages with the second ball thread nut in a manner such that it is rotatable but immovable in an axial direction relative to the table. The first ball thread shaft is coupled to the first motor, the first motor is fixed to the machine base, the second ball thread shaft is coupled to the second motor, and the second motor is fixed to the table.

A length obtained by adding a relative movement distance of the saddle relative to the table to a size of the saddle in a direction of movement relative to the table can be shorter than a size of the table in a direction of movement relative to the saddle.

According to the present invention, it is possible to provide a structure of a machine tool having a protective structure in which position of a table relative to a drive part is fixed, which can suppress the size of the machine tool, and which is inexpensive and reliable.

In addition, according to the present invention, it is possible to provide a structure of a machine tool that can be controlled synchronizing a first axis and a second axis that are control axes at high precision.

BRIEF DESCRIPTION OF THE DRAWINGS

The aforementioned and other objects and features of the present invention will be apparent from the following description of embodiments with reference to the accompanying drawings in which.

DETAILED DESCRIPTION OF THE PREFERRED EMBODIMENTS

Figure 1:
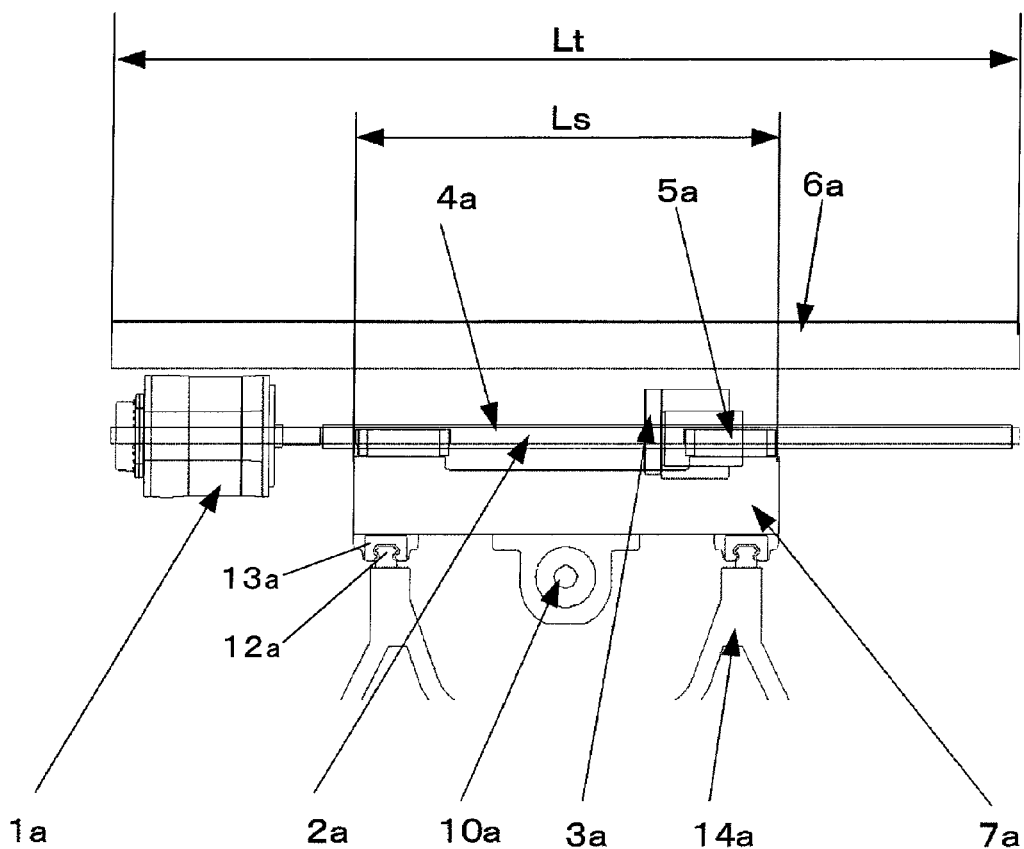
FIG. 1 is a front view for explaining first and second embodiments of a feeder for a machine tool according to the present invention.

First and second embodiments of a feeder for a machine tool according to the present invention will be described with reference to FIGS. 1 and 2.

First Embodiment

A feeder for a machine tool according to the embodiment has a structure in which a table 6a is moved relative to a saddle 7a in one axial direction.

The machine tool includes the saddle 7a and the table 6a that moves relative to the saddle 7a in one axial direction. A ball thread nut 3a that engages with a ball thread shaft 2a is fixed on an upper surface (a surface facing the table 6a) of the saddle 7a. On the other hand, the ball thread shaft 2a is attached on a lower surface (a surface facing the saddle 7a) of the table 6a in a manner such that the ball thread shaft 2a engages with the nut 3a, is rotatable but not movable in the axial direction of the thread shaft 2a relative to the table 6a. One end of the ball thread shaft 2a is coupled to a motor 1a fixed to the table 6a.

Further, rails 4a along a linear axis are fixed on both the left and right portions of the lower surface of the table 6a, and bearings 5a along the linear axis that bear the rails 4a are fixed on both the left and right portions of the upper surface of the saddle 7a.

According to the embodiment, a length obtained by adding a relative movement distance S of the saddle 7a relative to the table 6a (see FIG. 3) to a size Ls of the saddle 7a in the direction of movement relative to the table 6a (see FIG. 1) can be shorter than a size Lt of the table 6a in the direction of movement relative to the saddle 7a (i.e., (Ls+S)<Lt). As a result, the feeder for a machine tool according to the embodiment can be reduced in size and cost.

Figure 3:
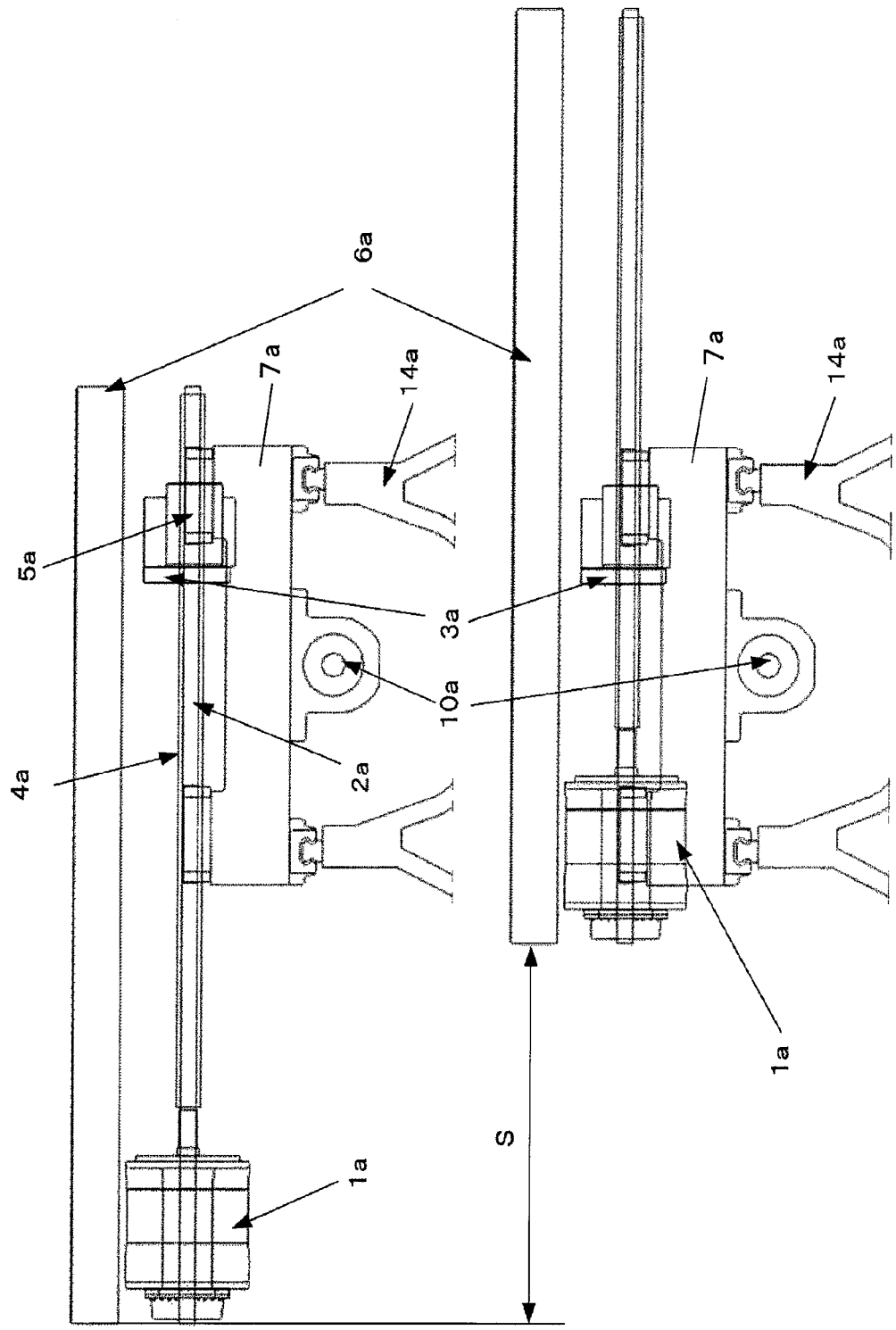
FIG. 3 is a view for explaining that a table moves together with a motor drive part (a thread shaft and a motor) when the table is moved relative to a saddle in the feeder for a machine tool of FIG. 1.
Figure 4:
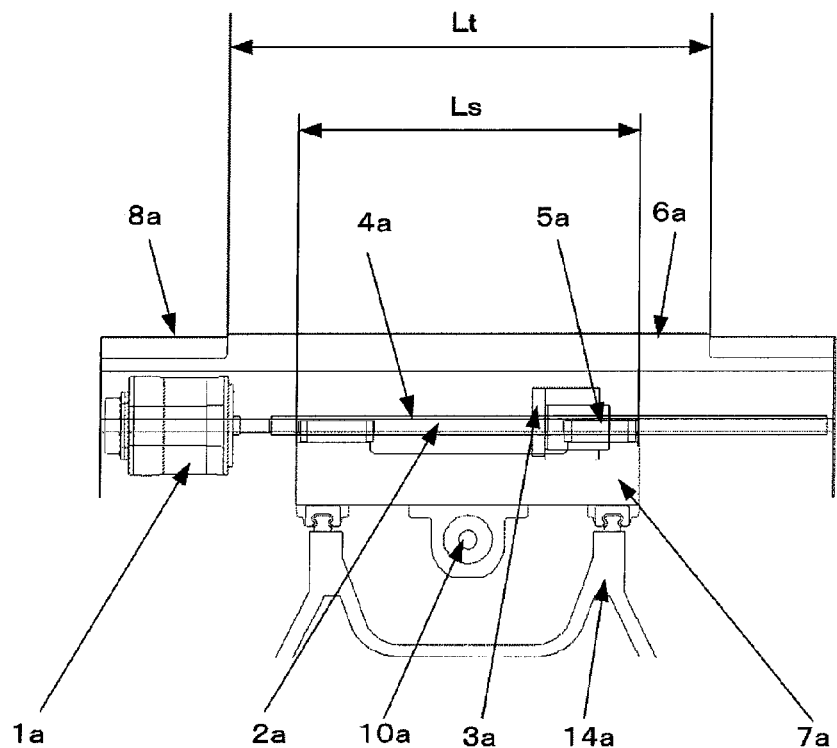
FIG. 4 is a view for explaining that a telescopic cover need not be used but a fixed cover can be used for covering the motor drive part in the feeder for a machine tool shown in FIG. 1.
Figure 5:
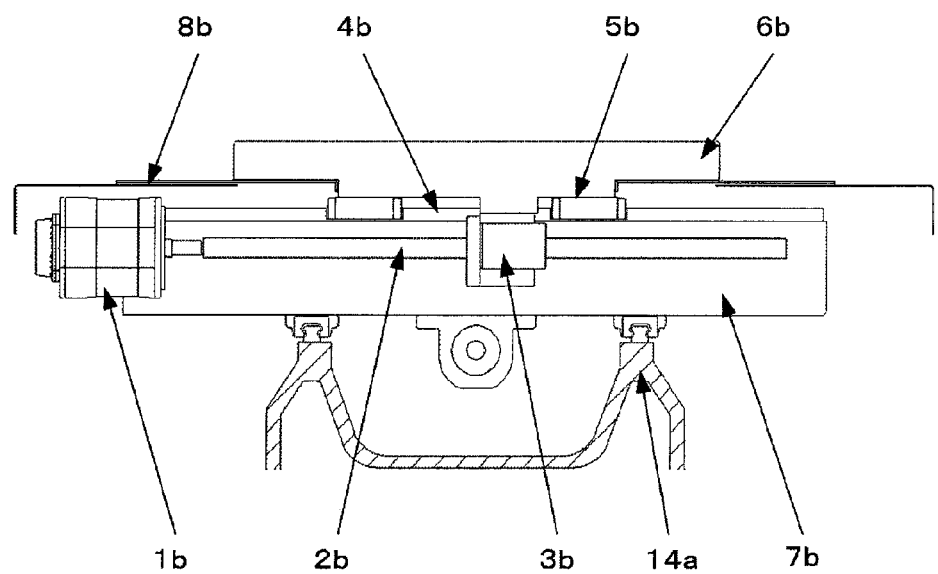
FIG. 5 is a front view for explaining a feeder for a machine tool according to the related art.
Figure 6:
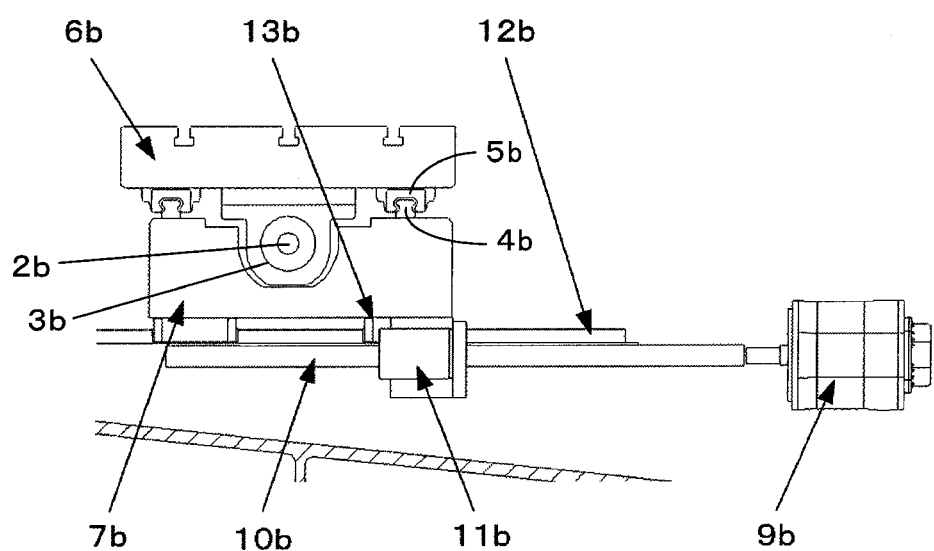
FIG. 6 is a side view of the feeder for a machine tool shown in FIG. 5.

Further, in the embodiment, the relative positional relation between the table 6a and the motor drive part including the motor 1a and the thread shaft 2a is fixed. In addition, as shown in FIG. 3, the saddle 7a is always below the table 6a even when the table 6a moves relative to the saddle 7a in the axial direction of the thread shaft 2a. Accordingly, a telescopic cover need not be used for the motor drive part (the ball thread shaft 2a and the motor 1a coupled to the thread shaft 2a), but a fixed cover 8a (see FIG. 4) can be used therefor as necessary. Since the fixed cover 8a has a simpler structure than a telescopic cover (see FIG. 5), a feeder for a machine tool having a protective structure that can suppress the size of the feeder for a machine tool and that is inexpensive and reliable can be provided according to the embodiment.

Second Embodiment

A feeder for a machine tool according to the embodiment has a structure in which a table 6a is moved relative to a saddle 7a in two axial directions perpendicular to each other.

The machine tool includes the saddle 7a that moves relative to a machine base 14a in a first direction and the table 6a that moves relative to the saddle 7a in a second direction perpendicular to the first direction. A ball thread nut 11a (hereinafter referred to as a first nut) that engages with a ball thread shaft 10a (hereinafter referred to as a first thread shaft) is fixed on a lower surface of the saddle 7a. On the other hand, the first thread shaft 10a is attached on the machine base 14a in a manner such that the first thread shaft 10a engages with the first nut 11a, is rotatable but not movable in the axial direction of the first thread shaft 10a relative to the machine base 14a. One end of the first thread shaft 10a is coupled to a motor 9a (hereinafter referred to a first motor) fixed to the machine base 14a.

Rails 12a (hereinafter referred to as first rails) along a linear axis are fixed on an upper surface of the machine base 14a, and bearings 13a (hereinafter referred to as first bearings) along the linear axis that bear the first rails 12a are fixed on the lower surface of the saddle 7a.

In addition, a ball thread nut 3a (hereinafter referred to as a second nut) that engages with a ball thread shaft 2a (hereinafter referred to as a second thread shaft) is fixed on an upper surface (a surface facing the table 6a) of the saddle 7a. On the other hand, the second thread shaft 2a is attached on a lower surface (a surface facing the saddle 7a) of the table 6a in a manner such that the second thread shaft 2a engages with the second nut 3a, is rotatable but is not movable in the axial direction of the second thread shaft 2a relative to the table 6a. One end of the second thread shaft 2a is coupled to a motor 1a (hereinafter referred to a second motor) fixed to the table 6a.

Rails 4a (hereinafter referred to as second rails) along a linear axis are fixed on both the left and right portions of the lower surface of the table 6a, and bearings 5a (hereinafter referred to as second bearings) along the linear axis that bear the second rails 4a are fixed on both the left and right portions of the upper surface of the saddle 7a.

According to the embodiment, a length obtained by adding a relative movement distance S of the saddle 7a relative to the table 6a (see FIG. 3) to a size Ls of the saddle 7a in the direction of movement relative to the table 6a (see FIG. 1) can be shorter than a size Lt of the table 6a in the direction of movement relative to the saddle 7a (i.e., (Ls+S)<Lt). As a result, the feeder for a machine tool according to the embodiment can be reduced in size and cost.

Further, in the embodiment, the relative positional relation between the table 6a and the motor drive part including the motor 1a and the thread shaft 2a is fixed. In addition, as shown in FIG. 3, the saddle 7a is always below the table 6a even when the table 6a moves relative to the saddle 7a in the axial direction of the thread shaft 2a. Accordingly, a telescopic cover need not be used for the motor drive part (the ball thread shaft 2a and the motor 1a that is for driving the table and coupled to the thread shaft 2a), but a fixed cover 8a (see FIG. 4) can be used as necessary. Since the fixed cover 8a has a simpler structure than a telescopic cover (see FIG. 5), a feeder for a machine tool having a protective structure that can suppress the size of the feeder for a machine tool and that is inexpensive and reliable can be provided according to the embodiment.

In addition, according to the embodiment, the mass difference between the first axis and the second axis is caused only by the mass of the ball thread nut 3a (the second nut), the bearings 5a (second bearings) along the linear axis and the saddle 7a. Accordingly, the mass difference between the first axis and the second axis can be reduced as compared to the structure of the related art. Specifically, since the drive components such as the motor 1a (the second motor) configured to rotationally drive the ball thread shaft 2a (the second thread shaft) is fixed to the table 6a and only the ball thread nut 3a (the second nut) and the bearings 5a (the second bearings) along the linear axis are fixed to the saddle 7a, the saddle 7a can be reduced in size and weight. Thus, by reducing the mass difference between the components moved on the first axis and the components moved on the second axis and also reducing the size and the weight of the components, the mass difference between the first axis and the second axis can be reduced and the first axis and the second axis can be controlled in synchronization with each other at high precision.

Figure 2:
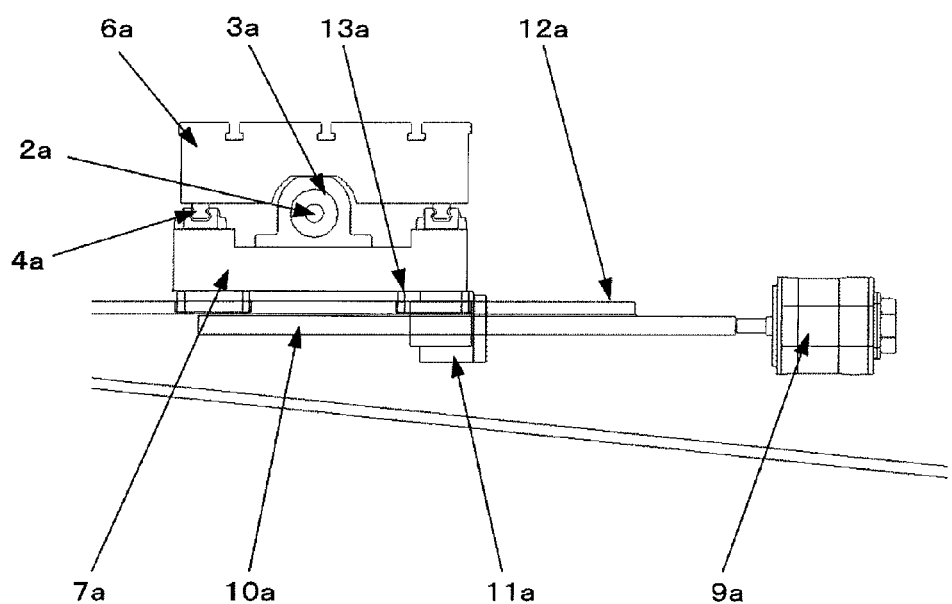
FIG. 2 is a side view of the feeder for a machine tool shown in FIG. 1.

The coupling of the ball thread shafts 2a, 10a and the motors 1a, 9a are shown to be made by direct coupling in FIGS. 1 and 2. However, the coupling is obviously not limited to those shown but coupling by means of belts, gears, or the like instead of direct coupling are also included in embodiments of the present invention.

The invention claimed is:

1. A feeder for a machine tool adapted to move a table relative to a saddle by rotation of a motor, the feeder comprising:
    a ball thread nut fixed to the saddle; and
    a ball thread shaft that engages with the ball thread nut in a rotatable manner but is immovable in an axial direction of the ball thread shaft relative to the table, wherein
    the motor is fixed to the table and the ball thread shaft is coupled to the motor, and
    a sum of a movable distance of the table relative to the saddle and a length of the saddle in the axial direction is shorter than a length of the table in the axial direction, and
    the feeder further comprises:
        rails fixed to the table on its surface where the motor is fixed; and
        bearings that are fixed to the saddle and bear the rails.

2. A feeder for a machine tool adapted to move a saddle relative to a machine base in a first axial direction by means of a first motor and to move a table relative to the saddle in a second axial direction perpendicular to the first axial direction by means of a second motor, the feeder comprising:
    a first ball thread nut fixed to the saddle;
    a first ball thread shaft that engages with the first ball thread nut in a rotatable manner but is immovable in the first axial direction relative to the machine base;
    a second ball thread nut fixed to the saddle; and
    a second ball thread shaft that engages with the second ball thread nut in a rotatable manner but is immovable in the second axial direction relative to the table, wherein
    the first ball thread shaft is coupled to the first motor,
    the first motor is fixed to the machine base,
    the second ball thread shaft is coupled to the second motor,
    the second motor is fixed to the table,
    the feeder further comprises:
    rails fixed to the table on its surface where the second motor is fixed; and
    bearings that are fixed to the saddle and bear the rails, and
    a sum of a movable distance of the table relative to the saddle and a length of the saddle in the second axial direction is shorter than a length of the table in the second axial direction.

\* \* \* \* \*